United States Patent
Qiao et al.

(10) Patent No.: US 12,309,650 B2
(45) Date of Patent: May 20, 2025

(54) METHOD FOR SELECTING CELL IN NTN AND APPARATUS

(71) Applicant: HUAWEI TECHNOLOGIES CO., LTD., Shenzhen (CN)

(72) Inventors: Yunfei Qiao, Hangzhou (CN); Meixin Lin, Hangzhou (CN); Xian Meng, Hangzhou (CN); Yu Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 501 days.

(21) Appl. No.: 17/559,264

(22) Filed: Dec. 22, 2021

(65) Prior Publication Data

US 2022/0116844 A1 Apr. 14, 2022

Related U.S. Application Data

(63) Continuation of application No. PCT/CN2020/094215, filed on Jun. 3, 2020.

(30) Foreign Application Priority Data

Jun. 28, 2019 (CN) .......................... 201910574204.9

(51) Int. Cl.
*H04W 36/00* (2009.01)
*H04W 36/22* (2009.01)
*H04W 36/30* (2009.01)

(52) U.S. Cl.
CPC ... *H04W 36/00838* (2023.05); *H04W 36/304* (2023.05); *H04W 36/0064* (2023.05); *H04W 36/22* (2013.01)

(58) Field of Classification Search
CPC ......... H04W 36/00838; H04W 36/304; H04W 36/0064; H04W 36/22; H04W 48/20;
(Continued)

(56) References Cited

U.S. PATENT DOCUMENTS

| | | | |
|---|---|---|---|
| 6,594,469 B1 | 7/2003 | Serri et al. | |
| 2010/0296599 A1* | 11/2010 | Lee | H04B 7/0619 375/267 |

(Continued)

FOREIGN PATENT DOCUMENTS

| | | | |
|---|---|---|---|
| CN | 102510304 A | * | 6/2012 |
| CN | 104320831 A | | 1/2015 |

(Continued)

OTHER PUBLICATIONS

Sony, "Consideration on mobility impacts of NTN support in NR", R2-1907049, (Revision of R2-1901426), 3GPP TSG RAN WG2 Meeting #106 Reno, USA, May 13-17, 2019, 2 pages, XP051730499.

(Continued)

*Primary Examiner* — Kodzovi Acolatse
*Assistant Examiner* — Anindita Sen
(74) *Attorney, Agent, or Firm* — Maier & Maier, PLLC

(57) ABSTRACT

A method for selecting a cell in a non-terrestrial network (NTN) The method includes user equipment queries whether there is first prestored information and determines a frequency for preferential searching based on the first prestored information. The user equipment then determines values of a first decision factor, a second decision factor, a first weighting coefficient, and a second weighting coefficient in a first decision criterion. The user equipment searches for a cell according to the determined first decision criterion and selects a cell with the largest value of the first decision criterion is largest to camp.

13 Claims, 5 Drawing Sheets

(58) Field of Classification Search
CPC . H04W 84/06; H04W 48/16; H04W 36/0085; H04B 7/18539; H04B 7/1851
See application file for complete search history.

(56) References Cited

U.S. PATENT DOCUMENTS

| | | | | |
|---|---|---|---|---|
| 2015/0155972 | A1* | 6/2015 | Umeda | H04L 1/005 375/341 |
| 2015/0341096 | A1* | 11/2015 | Gao | H04B 17/21 370/278 |
| 2016/0095109 | A1* | 3/2016 | Scott | H04B 7/18539 370/229 |
| 2016/0323032 | A1 | 11/2016 | Ulupinar et al. | |
| 2017/0105153 | A1 | 4/2017 | Ashrafi et al. | |
| 2017/0325244 | A1 | 11/2017 | Zhang et al. | |
| 2020/0028575 | A1* | 1/2020 | Buer | H04B 7/2041 |
| 2020/0356999 | A1* | 11/2020 | Pandey | G06Q 10/06311 |
| 2023/0050226 | A1* | 2/2023 | Wyckoff | H04J 13/0077 |
| 2023/0102334 | A1* | 3/2023 | Roy | H04W 36/06 370/316 |
| 2023/0140643 | A1* | 5/2023 | Hancharik | H04B 7/18517 455/12.1 |
| 2023/0156822 | A1* | 5/2023 | Zhou | H04W 74/0841 370/329 |
| 2023/0179294 | A1* | 6/2023 | Kuang | H04B 7/18513 370/316 |
| 2023/0209526 | A1* | 6/2023 | Li | H04L 5/001 370/329 |
| 2023/0217240 | A1* | 7/2023 | Jung | H04W 8/186 455/422.1 |
| 2023/0354138 | A1* | 11/2023 | Leng | H04W 48/20 |
| 2023/0396324 | A1* | 12/2023 | Chen | H04B 7/18513 |
| 2023/0412252 | A1* | 12/2023 | Miller | H04B 7/18513 |
| 2023/0417903 | A1* | 12/2023 | Greenidge | H04B 7/18515 |
| 2024/0014891 | A1* | 1/2024 | Chen | H04B 7/18513 |
| 2024/0022317 | A1* | 1/2024 | Cho | H04B 7/18513 |

FOREIGN PATENT DOCUMENTS

| | | | |
|---|---|---|---|
| CN | 106102099 | A | 11/2016 |
| CN | 109075853 | A | 12/2018 |
| CN | 109474326 | A | 3/2019 |
| JP | 2018512786 | A | 5/2018 |
| WO | WO-2017189862 | A1 * | 11/2017 ........... H04B 7/1851 |
| WO | 2018/052744 | A2 | 3/2018 |

OTHER PUBLICATIONS

ZTE Corporation et al., Consideration on the cell definition and NTN mobility, 3GPP TSG-RAN WG2 Meeting #104, R2-1817062, Spokane, USA, Nov. 12-16, 2018, total 13 pages.

Sony, Service continuity in NTN, 3GPP TSG RAN WG2 Meeting #106, R2-1907051, Reno, USA, May 13-17, 2019, total 3 pages.

3GPP TS 38.213 V15.0.0, "3rd Generation Partnership Project; Technical Specification Group Radio Access Network; NR; Physical layer procedures for control (Release 15)", Dec. 2017, 56 pages.

* cited by examiner

300

S310 User equipment queries whether there is prestored information, and determines a frequency for preferential searching based on the prestored information S320 The user equipment determines values of two decision factors S330 The user equipment determines value configurations of A and B in a criterion X S340 The user equipment searches for a cell according to the determined criterion X

FIG. 3

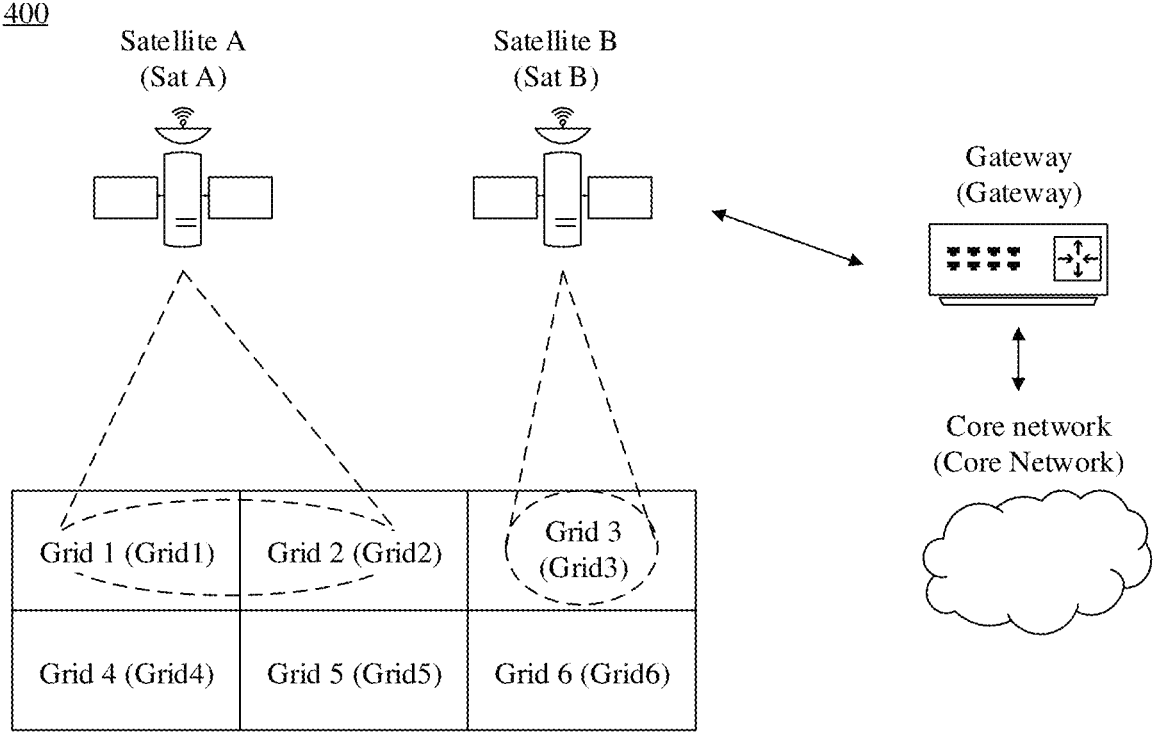

FIG. 4

METHOD FOR SELECTING CELL IN NTN AND APPARATUS

CROSS-REFERENCE TO RELATED APPLICATIONS

This application is a continuation of International Application No. PCT/CN2020/094215, filed on Jun. 3, 2020, which claims priority to Chinese Patent Application No. 201910574204.9, filed on Jun. 28, 2019. The disclosures of the aforementioned applications are hereby incorporated by reference in their entireties.

BACKGROUND

With development of information technologies, modern communications systems require more efficient, flexible, diversified communication. At present, satellites play an irreplaceable role in some scenarios, for example, in the fields of space communication, aeronautical communication, maritime communication, military communication, and the like. Satellite communication has advantages of a long communication distance, a large coverage area, and flexible networking, and can provide services for various mobile terminals as well as fixed terminals.

A conventional terrestrial network cannot provide seamless coverage for user equipment (UE), especially in places in which base stations cannot be deployed, such as in seas, in deserts, or in the air. Therefore, a non-terrestrial network (NTN) is introduced into a fifth generation (5G) mobile communications system. The non-terrestrial network provides seamless coverage for user equipment by deploying base stations or some functions of the base stations on high-altitude platforms or satellites. In addition, the high-altitude platforms or the satellites are less subject to natural disasters, so that reliability of the 5G system can be improved. In a satellite-based non-terrestrial network (NTN), a satellite covers the ground by using different beams to form satellite cells. User equipment may be covered by a plurality of satellite cells at the same time. In this case, the user equipment needs to select a cell or re-camp on a cell.

As described above, in a satellite system-based non-terrestrial network (NTN), an area may be covered by beams from a plurality of satellites at the same time, and beam coverage duration of the satellites may be different. According to a conventional solution for selecting or reselecting a cell in which only a signal power condition is considered but an over-the-top time of a satellite is not considered, a terminal may select a cell with optimal signal quality but short coverage duration to camp on. In this case, the terminal needs to reselect a cell soon. Consequently, signaling overheads are increased. In addition, because of high-speed movement among cells in the non-terrestrial network (NTN), cell selection performed based on measurement of a single parameter signal power cannot meet requirements of different scenarios and different users.

SUMMARY

A method for selecting a cell in a non-terrestrial network (NTN) scenario and an apparatus configured to design a new cell selection or reselection policy by introducing a plurality of parameters including beam coverage duration, are provided so as to comprehensively determine an optimal cell for camping.

According to a first aspect, a method for selecting a cell in a non-terrestrial network (NTN) is provided. User equipment queries whether there is first prestored information, and determines a frequency for preferential searching based on the first prestored information; determines a value of a first decision factor and a value of a second decision factor in a first decision criterion; determines a value of a first weighting coefficient and a value of a second weighting coefficient in the first decision criterion; searches for a cell according to the determined first decision criterion; and selects a cell whose value of the first decision criterion is largest to camp on if a value of the first decision criterion of a candidate cell meets a camping threshold requirement of a cell, or selects a cell whose value of the first decision criterion is largest to camp on if there is no candidate cell whose value of the first decision criterion meets a camping threshold requirement of a cell.

Different from a cell that is static in a cellular network, a cell in the NTN is in a high-speed movement state. A terminal may select a cell with optimal signal quality but short coverage duration to camp on. In this case, the terminal needs to reselect a cell soon. Consequently, signaling overheads are increased. According to the foregoing solution, coverage duration of a satellite cell is used as a basis for cell selection, and frequent cell handover resulting from cell selection that is performed based on only single signal quality can be alleviated by configuring different weighting factors.

With reference to the first aspect, in a first possible implementation of the first aspect, the first decision criterion is expressed as follows: $X_{lex}=A^*(\text{Signal\_Quality}/\text{Signal\_Quality\_reference})+B^*(\text{DurationTime}_{beam}/\text{DurationTime}_{beam}\_\text{reference})$.

Signal_Quality/Signal_Quality_reference (signal quality ratio) is the first decision factor, and $\text{DurationTime}_{beam}/\text{DurationTime}_{beam}\_\text{reference}$ (beam coverage time ratio) is the second decision factor. A is the first weighting coefficient and is used to represent a weight of the first decision factor in first decision criterion-based cell selection decision. B is the second weighting coefficient and is used to represent a weight of the second decision factor in the first decision criterion-based cell selection decision. A function relationship of the first decision criterion $X_{lex}$ is calculating a sum of a weighted result obtained by multiplying the value of the first decision factor and the first weighting coefficient and a weighted result obtained by multiplying the value of the second decision factor and the second weighting coefficient.

According to the foregoing solution, more types of parameters that need to be evaluated during cell selection are used, and a corresponding criterion is modified, so that a more appropriate cell selection criterion can be obtained by configuring different weighting factors and comprehensively considering impact of a plurality of factors.

With reference to the first possible implementation of the first aspect, in a second possible implementation of the first aspect, a value of Signal_Quality (signal quality) in the first decision factor is a value of a criterion S in an existing standard.

According to the foregoing solution, reliability of a cell selection decision criterion in the NTN is increased based on a cell selection criterion S in a cellular network.

With reference to the first or the second possible implementation of the first aspect, in a third possible implementation of the first aspect, a method for obtaining the value of $\text{DurationTime}_{beam}$ (beam coverage time) in the second decision factor includes: A network-side system divides the ground into several geographic grids, obtains beam coverage information of each grid in a period of time based on an ephemeris, and schedules a satellite network device to deliver the beam coverage information to user equipment in each grid; and the user equipment in each grid queries for a current time, and compares the current time with the received beam coverage information, to obtain the value of $DurationTime_{beam}$ (beam coverage time) in the second decision factor.

According to the foregoing solution, in the NTN, a satellite cell may broadcast coverage duration for a specific area to user equipment in the area, and the user equipment may obtain the value of $DurationTime_{beam}$ (beam coverage time) in the second decision factor after processing the coverage duration. $DurationTime_{beam}$ (beam coverage time) may be subsequently used as a determining basis for cell selection in the first decision criterion.

With reference to the third possible implementation of the first aspect, in a fourth possible implementation of the first aspect, the beam coverage information includes: a beam identifier (ID), a start time at which a beam covers a current grid, and an over time at which the beam covers the current grid.

According to the foregoing solution, the user equipment may calculate the value of $DurationTime_{beam}$ (beam coverage time) in the first decision factor based on the foregoing parameters and the current time that is obtained through querying.

With reference to the third or the fourth possible implementation of the first aspect, in a fifth possible implementation of the first aspect, the beam coverage information further includes: the beam identifier (ID), the start time at which the beam covers the current grid, and duration for which the beam covers the current grid.

According to the foregoing solution, the user equipment may alternatively calculate the value of $DurationTime_{beam}$ (beam coverage time) in the first decision factor based on the foregoing parameters and the current time that is obtained through querying.

With reference to all the possible implementations of the first aspect, in a sixth possible implementation of the first aspect, a value of Signal_Quality_reference (reference signal quality) in the first decision factor and a value of $DurationTime_{beam\_}$reference (reference beam coverage time) in the second decision factor are known preset values. The preset values may be obtained through calculation or querying by the user equipment.

According to the foregoing solution, the user equipment obtains the values of Signal_Quality_reference (reference signal quality) and $DurationTime_{beam\_}$reference (reference beam coverage time) through calculation or querying, then obtains the value of the first decision factor and the value of the second decision factor in the first decision criterion, and finally obtains a value of the first decision criterion, for cell selection by the user equipment. The value of Signal_Quality_reference (reference signal quality) and the value of $DurationTime_{beam\_}$reference (reference beam coverage time) are used to normalize the value of Signal_Quality (signal quality) and the value of $DurationTime_{beam}$ (beam coverage time) to unify a measurement dimension.

With reference to the first aspect and the first possible implementation of the first aspect, in a seventh possible implementation of the first aspect, a method for determining the value of the first weighting coefficient and the value of the second weighting coefficient in the first decision criterion includes: configuring the value of the first weighting coefficient and the value of the second weighting coefficient based on a service type.

According to the foregoing solution, the user equipment may configure different values of the first weighting coefficient and different values of the second weighting coefficient based on different service types. The value configuration manner meets requirements of different scenarios and different user equipment and is used by the user equipment to obtain more appropriate weighting coefficient values.

With reference to the seventh possible implementation of the first aspect, in an eighth possible implementation of the first aspect, the service type includes at least one of the following: an IoT device, a fixed access point, and a mobile device.

According to the foregoing solution, a weighting coefficient configuration method is provided based on different scenarios and different user equipment types. This can meet requirements of different scenarios and different user equipment and optimize a cell selection policy.

With reference to the first aspect and the first possible implementation of the first aspect, in a ninth possible implementation of the first aspect, a method for determining the value of the first weighting coefficient and the value of the second weighting coefficient in the first decision criterion further includes: configuring the value of the first weighting coefficient and the value of the second weighting coefficient based on service duration.

According to the foregoing solution, another method for configuring a weighting coefficient value is provided from another perspective and may be applied to some scenarios in the NTN.

With reference to the first aspect, in a tenth possible implementation of the first aspect, the first prestored information includes a carrier frequency.

According to the foregoing solution, in stored information-based cell selection, for example, if the prestored information is the carrier frequency, the user equipment preferentially selects a cell in which the carrier frequency information is prestored to camp. The user equipment initiates initial cell selection only if cells storing carrier frequencies are all inappropriate.

According to a second aspect, a method for reselecting a cell in a non-terrestrial network (NTN) is provided. The method includes: User equipment queries whether there is second prestored information, and determines a frequency for preferential searching based on the second prestored information; determines a value of a third decision factor and a value of a fourth decision factor in a second decision criterion; determines a cell to camp on based on a priority sequence determined in the second decision criterion; and when a priority of the third decision factor is higher than a priority of the fourth decision factor, selects a cell whose value of the third decision factor is largest to camp on if a value of the third decision factor of a current cell is less than a preset threshold and there is at least one neighboring cell whose value of the third decision factor is greater than the preset threshold, or selects a cell whose value of the fourth decision factor is largest to camp on if a value of the third decision factor of a current cell is less than a preset threshold and there is no neighboring cell whose value of the third decision factor is greater than the preset threshold; or when a priority of the fourth decision factor is higher than a priority of the third decision factor, selects a cell whose value of the fourth decision factor is largest to camp on if a value of the fourth decision factor of a current cell is less than a preset threshold and there is at least one neighboring cell whose value of the fourth decision factor is greater than the preset threshold, or selects a cell whose value of the third decision factor is largest to camp on if a value of the fourth decision factor of a current cell is less than a preset threshold and there is no neighboring cell whose value of the fourth decision factor is greater than the preset threshold. The third decision factor is Signal_Quality (signal quality), and the fourth decision factor is DurationTime$_{beam}$ (beam coverage time).

According to the foregoing solution, coverage duration of a satellite cell is used as a basis for cell selection. Different parameters are considered according to a priority principle. This implementation is simpler than the implementation process of the method for selecting a cell in the first aspect.

With reference to the second aspect, in a first possible implementation of the second aspect, the second decision criterion is expressed as follows:

$$X_{lex}=\text{Priority}(\text{Signal\_Quality},\text{DurationTime}_{beam}).$$

A function relationship of the second decision criterion $X_{lex}$ is that a priority sequence of the third decision factor Signal_Quality (signal quality) and the fourth decision factor DurationTime$_{beam}$ (beam coverage time) in cell selection decision is determined based on an agreed Priority (priority).

According to the foregoing solution, in the NTN, more types of parameters that need to be evaluated during cell selection are used, a priority function is configured, and a new cell selection criterion is generated. This implementation is simpler than the implementation process of the method for selecting a cell in the first aspect.

With reference to the first possible implementation of the second aspect, in a second possible implementation of the second aspect, the value of the third decision factor Signal_Quality is a value of a criterion S in an existing standard.

According to the foregoing solution, reliability of a cell selection decision criterion in the NTN is increased based on a cell selection criterion S in a cellular network.

With reference to the first or the second possible implementation of the second aspect, in a third possible implementation of the second aspect, a method for obtaining the value of the fourth decision factor DurationTime$_{beam}$ (beam coverage time) includes: A network-side system divides the ground into several geographic grids, obtains beam coverage information of each grid in a period of time based on an ephemeris, and schedules a satellite network device to deliver the beam coverage information to user equipment in each grid; and the user equipment in each grid queries for a current time, and compares the current time with the received beam coverage information, to obtain the value of the fourth decision factor DurationTime$_{beam}$ (beam coverage time).

According to the foregoing solution, in the NTN, a satellite cell may broadcast coverage duration for a specific area to user equipment in the area, and the user equipment may obtain the value of the fourth decision factor DurationTime$_{beam}$ (beam coverage time) after processing the coverage duration. DurationTime$_{beam}$ (beam coverage time) may be subsequently used as a determining basis for cell selection.

With reference to the third possible implementation of the second aspect, in a fourth possible implementation of the second aspect, the beam coverage information includes: a beam identifier (ID), a start time at which a beam covers a current grid, and an over time at which the beam covers the current grid.

According to the foregoing solution, the user equipment may calculate the value of the fourth decision factor DurationTime$_{beam}$ (beam coverage time) based on the foregoing parameters and the current time that is obtained through querying.

With reference to the third or the fourth possible implementation of the second aspect, in a fifth possible implementation of the second aspect, the beam coverage information further includes: the beam identifier (ID), the start time at which the beam covers the current grid, and duration for which the beam covers the current grid.

According to the foregoing solution, the user equipment may alternatively calculate the value of the fourth decision factor DurationTime$_{beam}$ (beam coverage time) based on the foregoing parameters and the current time that is obtained through querying.

With reference to the first possible implementation of the second aspect, in a sixth possible implementation of the second aspect, the second prestored information includes a carrier frequency.

According to the foregoing solution, in stored information-based cell selection, for example, the prestored information is the carrier frequency, the user equipment preferentially selects a cell in which the carrier frequency information is prestored to camp. The user equipment initiates initial cell selection only if cells storing carrier frequencies are all inappropriate.

According to a third aspect, a terminal device is provided. The terminal device includes: a transceiver unit, configured to receive beam coverage information delivered by a satellite network device; and a processing unit, configured to query whether there is first prestored information, and determine a frequency for preferential searching based on the first prestored information; determine a value of a first decision factor and a value of a second decision factor in a first decision criterion; determine a value of a first weighting coefficient and a value of a second weighting coefficient in the first decision criterion; search for a cell according to the determined first decision criterion; and select a cell whose value of the first decision criterion is largest to camp on if a value of the first decision criterion of a candidate cell meets a camping threshold requirement of a cell, or select a cell whose value of the first decision criterion is largest to camp on if there is no candidate cell whose value of the first decision criterion meets a camping threshold requirement of a cell. The terminal device is configured to perform the operations performed by the user equipment in the method for selecting a cell in the NTN provided in the first aspect.

With reference to the third aspect, in a first possible implementation of the third aspect, the processing unit is further configured to: query whether there is second prestored information, and determine a frequency for preferential searching based on the second prestored information; determine a value of a third decision factor and a value of a fourth decision factor in a second decision criterion; determine a cell to camp on based on a priority sequence determined in the second decision criterion; and when a priority of the third decision factor is higher than a priority of the fourth decision factor, select a cell whose value of the third decision factor is largest to camp on if a value of the third decision factor of a current cell is less than a preset threshold and there is at least one neighboring cell whose value of the third decision factor is greater than the preset threshold, or select a cell whose value of the fourth decision factor is largest to camp on if a value of the third decision factor of a current cell is less than a preset threshold and there is no neighboring cell whose value of the third decision factor is greater than the preset threshold; or when a priority of the fourth decision factor is higher than a priority of the third decision factor, select a cell whose value of the fourth decision factor is largest to camp on if a value of the fourth decision factor of a current cell is less than a preset threshold and there is at least one neighboring cell whose value of the fourth decision factor is greater than the preset threshold, or select a cell whose value of the third decision factor is largest to camp on if a value of the fourth decision factor of a current cell is less than a preset threshold and there is no neighboring cell whose value of the fourth decision factor is greater than the preset threshold. The terminal device is configured to perform the operations performed by the user equipment in the method for reselecting a cell in the NTN provided in the second aspect.

According to a fourth aspect, a satellite network device is provided. The satellite network device includes: a transceiver unit, configured to receive scheduling information that is related to beam coverage information and that is delivered by a network-side system, and send the beam coverage information to user equipment in each grid; and a processing unit, configured to process the scheduling information that is related to the beam coverage information and that is sent by the network-side system, and control a sending process of the beam coverage information. The satellite network device is configured to perform the operations performed by the satellite network device in the method for selecting or reselecting a cell in an NTN provided in the first aspect and the second aspect.

According to a fifth aspect, a communications apparatus is provided. The communications apparatus is configured to perform the method for selecting or reselecting a cell in an NTN provided in the first aspect or the second aspect. The communications apparatus further includes modules configured to perform the method for selecting or reselecting a cell in an NTN provided in the first aspect or the second aspect.

According to a sixth aspect, a communications apparatus is provided. The communications apparatus includes a memory and a processor. The memory is configured to store instructions. The processor is configured to execute the instructions stored in the memory. When the instructions stored in the memory are executed by the processor, the processor is enabled to perform the method for selecting or reselecting a cell in an NTN provided in the first aspect or the second aspect.

According to a seventh aspect, a chip is provided. The chip includes a processing module and a communications interface. The processing module is configured to control the communications interface to communicate with the outside, and the processing module is further configured to implement the method for selecting or reselecting a cell in an NTN provided in the first aspect or the second aspect.

According to an eighth aspect, a computer-readable storage medium is provided. The computer-readable storage medium stores a computer program. When the computer program is executed by a computer, the computer is enabled to implement the method for selecting or reselecting a cell in an NTN provided in the first aspect or the second aspect.

According to a ninth aspect, a computer program product including instructions is provided. When the instructions are executed by a computer, the computer is enabled to implement the method for selecting or reselecting a cell in an NTN provided in the first aspect or the second aspect.

According to a tenth aspect, a communications system is provided, including the communications apparatus in the fifth aspect that is configured to perform the method in the first aspect, and the communications apparatus in the fifth aspect that is configured to perform the method in the second aspect. The communications apparatus in the fifth aspect that is configured to perform the method in the first aspect is a terminal device or a satellite network device. The communications apparatus in the fifth aspect that is configured to perform the method in the second aspect is a terminal device or a satellite network device.

Based on the foregoing descriptions, in the method for selecting or reselecting a cell performed by user equipment in an NTN, more types of parameters that need to be evaluated during cell selection are used, and a more appropriate cell selection criterion is obtained by configuring different weighting factors or priority functions and comprehensively considering impact of a plurality of factors. In this way, an optimized cell selection policy can be obtained.

BRIEF DESCRIPTION OF DRAWINGS

To describe solutions in embodiments more clearly, the following briefly describes accompanying drawings for describing the embodiments.

FIG. 3 is a schematic flowchart of a method 300 for selecting a user cell in an NTN;

FIG. 4 is a schematic diagram of a method 500 for obtaining a beam coverage time;

DESCRIPTION OF EMBODIMENTS

The following clearly describes the solutions in detail with reference to the accompanying drawings.

Unless otherwise defined, all terms used herein have the same meaning as commonly understood by a person skilled in the art. Terms used are merely intended to describe embodiments but are not intended as limiting.

Figure 1:
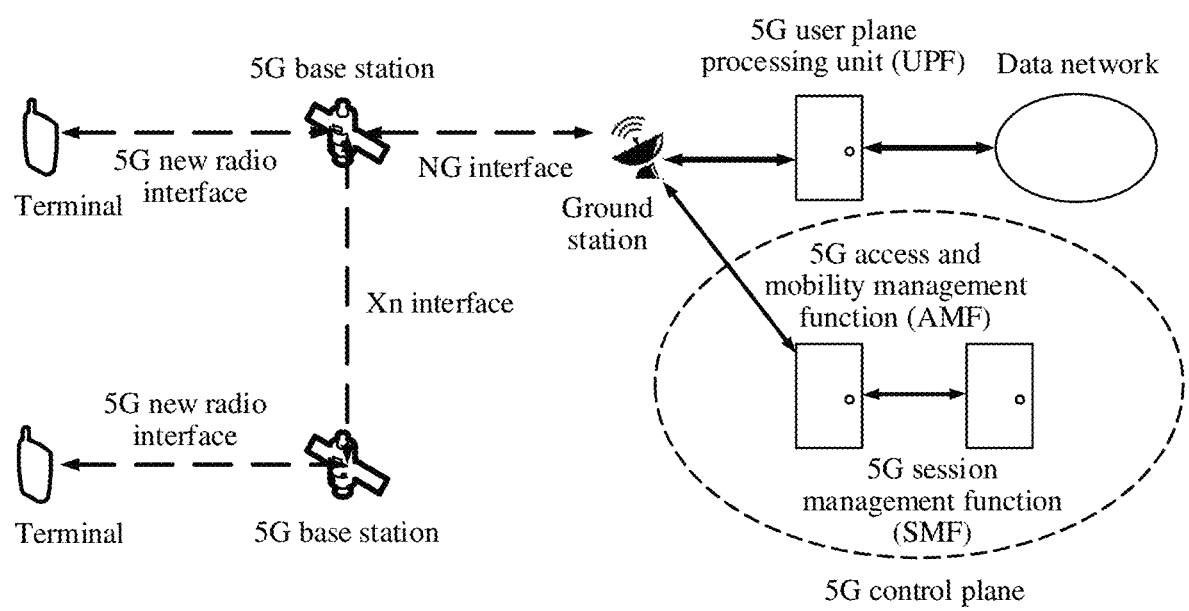
FIG. 1 shows a typical network application architecture.

In the field of satellite communication, members of the 3GPP incorporate satellite communication and 5G technologies and propose a typical network application architecture shown in FIG. 1 that may be applied. Terrestrial mobile user equipment accesses a network through a 5G new radio interface. A 5G base station is deployed on a satellite and is connected to a terrestrial core network through a radio link. In addition, there are radio links between satellites to implement signaling exchange and user data transmission between base stations. Network elements and interfaces between the network elements in FIG. 1 are described as follows.

The user equipment is a mobile device supporting 5G new radio interfaces, for example, a user terminal or a wearable device. The user equipment may access a satellite network through an air interface, initiate calls, access the Internet, and the like.

5G base station provides radio access services, schedules radio resources for access terminals, and provides reliable radio transmission protocols and data encryption protocols.

5G core network provides services such as user access control, mobility management, session management, user security authentication, and accounting. The 5G core network includes a plurality of functional units, which can be classified into control-plane functional entities and data-plane functional entities. An access and mobility management function (AMF) is responsible for user access management, security authentication, and mobility management. A user plane function (UPF) manages user-plane data transmission, traffic statistics collection, and lawful interception.

A ground station is responsible for forwarding signaling and service data between a satellite base station and a 5G core network.

A 5G new radio interface is a radio link between the user equipment and a base station.

An Xn interface is an interface between a 5G base station and a base station and is used for handover signaling exchange and the like.

An NG interface is an interface between a 5G base station and a 5G core network and is mainly used for exchange of NAS signaling of the core network and user service data.

Figure 2:
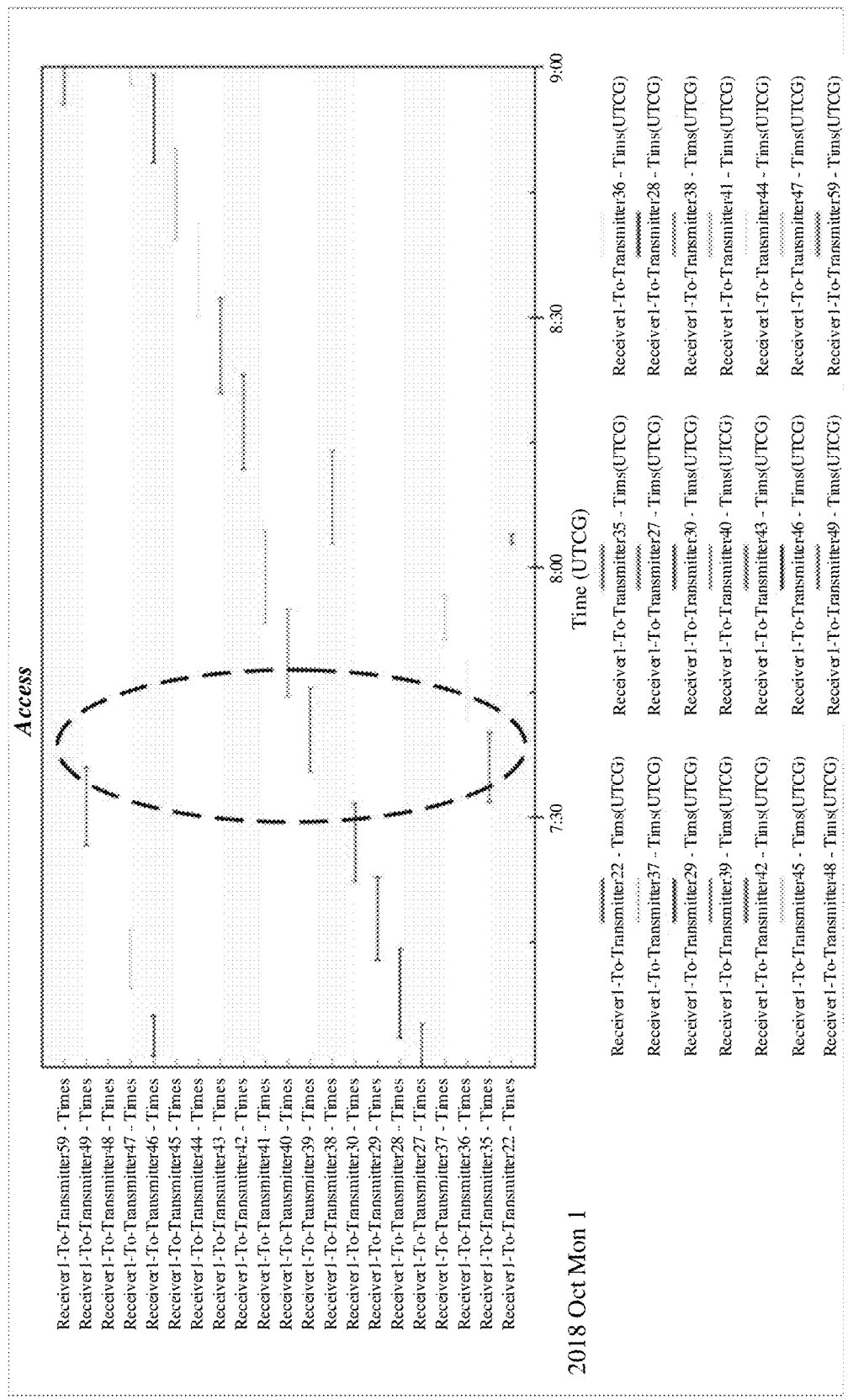
FIG. 2 is a simulation diagram of a case in which an area is covered by beams from a plurality of satellites.

In a satellite communications system in conventional technologies, an area may be covered by beams from a plurality of satellites. As shown in a simulation diagram of FIG. 2, between 7:30 and 7:45 marked by an ellipse circle, a receiver (receiver 1) may receive beams of five satellites numbered 49, 40, 30, 36, and 35. Each satellite has different beam coverage duration. According to a conventional solution for selecting or reselecting a cell in which only a signal power condition is considered but an over-the-top time of a satellite is not considered, a terminal may select a cell with optimal signal quality but short coverage duration to camp on. In this case, the terminal needs to reselect a cell soon. Consequently, signaling overheads are increased. In addition, because of high-speed movement among cells in a non-terrestrial network (NTN), cell selection performed based on measurement of a single parameter signal power cannot meet requirements of different scenarios and different users.

For the foregoing problem, a method selects a cell in an NTN scenario, to design a new cell selection or reselection policy by introducing a plurality of parameters including beam coverage duration, so as to comprehensively determine an optimal cell for camping.

Solutions provided in the embodiments may be applied to various communications systems, for example, a satellite communications system, and a system combining satellite communication and a cellular network. The cellular network system may include a long term evolution (LTE) system, a fifth generation (5G) mobile communications system, a new radio (NR) system, a machine to machine (M2M) communications system, another future evolved communications system, or the like. The satellite communications system may include various non-terrestrial network systems, which are not enumerated herein.

The user equipment in the embodiments may also be referred to as a terminal device, an access terminal, a subscriber unit, a subscriber station, a mobile station, a remote station, a remote terminal, a mobile device, a user terminal, a terminal, a wireless communications device, a user agent, or a user apparatus. The user equipment may alternatively be a cellular phone, a cordless phone, a session initiation protocol (SIP) phone, a wireless local loop (WLL) station, a personal digital assistant (PDA), a handheld device having a wireless communications function, a computing device or another processing device connected to a wireless modem, a vehicle-mounted device, a wearable device, a terminal device in a 5G network, or a terminal device in a future evolved public land mobile network (PLMN).

A satellite network device in the embodiments may be configured to communicate with one or more user equipment or may be configured to communicate with one or more base stations having some terminal functions (for example, communication between a macro base station and a micro base station such as an access point). A base station may be an evolved NodeB (eNB) in an LTE system, a base station (gNB) in a 5G system or an NR system, or another satellite base station and a satellite relay node. In addition, the base station may alternatively be an access point (AP), a transmission point (TRP), a central unit (CU), or another network entity, and may include some or all of functions of the foregoing network entities.

It should be further noted that the two descriptions of "cell" and "base station in a cell" are equivalent. In other words, a cell represents a base station. Moreover, the two descriptions of "satellite" and "satellite network device" are equivalent. In other words, a satellite may represent a set of satellites and other network devices related to satellite communication.

To better understand the solutions, some terms are first described.

1. Cell Selection

When the user equipment is powered on or enters a coverage area from a blind area, the user equipment searches for all frequencies allowed by a public land mobile network (PLMN) and selects an appropriate cell to camp on. This process is referred to as "cell selection". Cell selection includes two types of selection: initial cell selection and stored information-based cell selection. Regardless of the type of cell selection, a to-be-selected cell needs to be measured, to evaluate channel quality and determine whether the cell meets a camping condition. A cell selection criterion in a cellular network is referred to as a criterion S. When a value of S Srxlev of cell selection is greater than 0, camping is allowed.

2. Stored Information-Based Cell Selection

The user equipment has stored carrier frequency-related information, and may also include parameter information of some cells, for example, previously-received measurement control information or information about a previously camped on or detected cell. The user equipment preferentially selects a cell whose related information is stored. Once there is a suitable cell, the user equipment selects the cell and camps on the cell. The user equipment initiates initial cell selection only if cells storing the related information are all inappropriate.

3. Criterion S

The criterion S is a cell selection criterion in a cellular network, and the criterion S is expressed as follows:

$$Srxlev=Qrxlevmeas-(Qrxlevmin+Qrxlevminoffset)-Pcompensation-Qoffsettem.$$

Meanings of the parameters in the formula are as follows.
(1) Srxlev (unit: dB) represents a value of S of cell selection.
(2) Qrxlevmeas (unit: dBm) represents a value of a reference signal received power (RSRP) obtained by measuring a cell by the user equipment.
(3) Qrxlevmin (unit: dBm) represents a minimum receive strength of the reference signal received power (RSRP) in the cell and is obtained from a broadcast message.
(4) Qrxlevminoffset represents an offset value of Qrxlevmin. When the user equipment camping on a visited public land mobile network (VPLMN) searches for a high-priority PLMN, a specific offset value may be set to prevent ping-pong reselection. The offset value is mainly used for different user equipment operators.

(5) Pcompensation (unit: dBm) is equal to MAX (Pemax-Pumax, 0), that is, a larger value of 0 and a difference that is between an allowable maximum uplink transmit power of the user equipment in a cell and an actual maximum uplink transmit power of the user equipment.

(6) Pemax (unit: dBm) represents the allowable maximum uplink transmit power of the user equipment in the cell and is obtained from a broadcast message.

(7) Pumax (unit: dBm) is standard-defined, and represents a maximum uplink transmit power determined based on a capability of the user equipment.

(8) Qoffsettem represents a temporary offset value and is notified in system broadcast.

When performing cell selection, the user equipment obtains a value of Qrxlevmeas of a cell through measurement, obtains the other parameters in the formula of the criterion S based on system information of the cell and a capability level of the user equipment, calculates a value of Srxlev, and compares the value with 0. If Srxlev>0, the user equipment considers that the cell meets a channel quality requirement for cell selection and may select the cell to camp on. If the system information of the cell indicates that the user equipment is allowed to camp on, the user equipment selects to camp on the cell and enters an idle mode.

4. Mobility Measurement

Mobility measurement in a cellular system is a measurement in a connection state. After a network delivers a measurement configuration to the user equipment, the UE detects a signal status of a neighboring cell based on parameters such as a measurement object and a reported configuration that are indicated in the measurement configuration, fills in a measurement report, and feeds back the measurement report to the network, so that the network makes a handover decision, completes a neighboring cell list relationship, or the like.

5. Cell Reselection

Cellular cell reselection (cell reselection) is a process in which the user equipment in an idle mode selects a better cell to provide service signals by measuring signal quality of a neighboring cell and a current cell. When the signal quality and a level of the neighboring cell meet the criterion S and a reselection criterion, the UE accesses the cell to camp on.

Cell reselection may be classified into intra-frequency cell reselection and inter-frequency cell reselection. The intra-frequency cell reselection can resolve radio coverage problems. The inter-frequency cell reselection can implement load balancing by setting priorities of different frequencies, in addition to the radio coverage problems.

After the user equipment successfully camps on, the user equipment continuously performs measurement on the current cell. A radio resource control (RRC) layer calculates the value of S Srxlev based on a reference signal received power (RSRP) measurement result, and compares the value of S with a threshold for triggering intra-frequency measurement (Sintrasearch) and a threshold for triggering inter-frequency and inter-RAT measurement (Snonintrasearch) to determine whether to start neighboring cell measurement. After a measurement condition is met, the user equipment performs intra-frequency or inter-frequency measurement on neighboring cells, obtains to-be-selected cells based on a measurement result, and sorts the to-be-selected cells according to a specific criterion, to obtain a reselected target cell.

In a non-terrestrial network (NTN), more types of parameters that need to be evaluated during cell selection are used, and a corresponding criterion is modified, so that a more appropriate cell selection criterion can be obtained by configuring different weighting factors and comprehensively considering impact of a plurality of factors. A value of a criterion X $X_{lex}$ of a current cell is determined based on a plurality of parameters and a customized rule. Camping is allowed when the value $X_{lex}$ of the criterion X of the cell is greater than $X_{threshold}$. A general criterion is represented as follows:

$$X_{lex} = \text{Function}(\text{Signal\_Quality\_Related\_Parameter}, \text{DurationTime}_{beam}\_\text{Related\_Parameter}, \text{Parameter1}, \text{Parameter2} \dots)$$

Meanings of the parameters in the formula are as follows.

(1) $X_{threshold}$ represents a decision threshold for cell selection under the criterion X.

(2) Signal_Quality_Related_Parameter represents a parameter related to signal quality.

(3) DurationTime$_{beam}$_Related_Parameter represents a parameter related to beam coverage time.

(4) Parameter1, Parameter2 represent other parameters.

According to the foregoing general criterion, a method 300 selects a cell by a user in a non-terrestrial network (NTN). A specific criterion X in the method is as follows:

$$X_{lex} = A^*(\text{Signal\_Quality}/\text{Signal\_Quality\_reference}) + B^*(\text{DurationTime}_{beam}/\text{DurationTime}_{beam}\_\text{reference})$$

It should be noted that a first decision factor (signal quality ratio (Signal_Quality/Signal_Quality_reference)) and a second decision factor (beam coverage time ratio (DurationTime$_{beam}$/DurationTime$_{beam}$_reference)) are both normalized reference values. A function relationship of the criterion X $X_{lex}$ is calculating a sum of a weighted result obtained by multiplying a value of the first decision factor and a first weighting coefficient A and a weighted result obtained by multiplying a value of the second decision factor and a second weighting coefficient B. The weighting coefficient A and the weighting coefficient B are respectively used to represent a weight of the signal quality ratio (Signal_Quality/Signal_Quality_reference) and a weight of the beam coverage time ratio (DurationTime$_{beam}$/DurationTime$_{beam}$_reference) in cell selection decision according to the criterion X.

A value of a criterion S in an existing standard, that is, a value of the criterion S Srxlev, may be reused as a value of signal quality (Signal_Quality) in the first decision factor (signal quality ratio (Signal_Quality/Signal_Quality_reference)). A value of a beam coverage time (DurationTime$_{beam}$) in the second decision factor (beam coverage time ratio DurationTime$_{beam}$/DurationTime$_{beam}$_reference)) may be obtained by using a method 500 for obtaining a beam coverage time. Details are described in the following, and details are not described herein. A value of reference signal quality (Signal_Quality_reference) in the first decision factor (signal quality ratio (Signal_Quality/Signal_Quality_reference)) and a value of a reference beam coverage time (DurationTime$_{beam}$_reference) in the second decision factor (beam coverage time ratio (DurationTime$_{beam}$/DurationTime$_{beam}$_reference)) are known preset values of the user equipment. The values may vary with different scenarios, different user equipment vendors, different user equipment operators, and other factors. The preset values may be obtained through calculation or querying by the user equipment.

Further, a value of the weighting coefficient A and a value of the weighting coefficient and B may have a plurality of configurations. The user equipment may query a table for value configurations of A and B in the current criterion X based on a service type and service duration of a current service. For example, the value of the weighting coefficient A and the value of the weighting coefficient B include but are not limited to configuration types in the following table. Alternatively, the value of A and the value of B may be configured based on any combination of different configuration types in the following table. Alternatively, the value of A and the value of B may be a combination of the configuration types in Table 1 and Table 2 and another configuration type. This is not limited. For example, the value of A and the value of B are configured based on service types listed in Table 1. When the user equipment is used in cell selection in Internet of Things communication, communication coverage is concerned. If the user equipment is an IoT device, a value of the first weighting coefficient A may be 1, and a value of the second weighting coefficient B is 0. When the user equipment is used in cell selection in fixed access communication, a communication throughput is concerned. If the user equipment is a fixed access point, a value of the first weighting coefficient A may be 0.1, and a value of the second weighting coefficient B is 0.9. When the user equipment is used in cell selection in mobile broadband communication, if the user equipment is a mobile device, a value of the first weighting coefficient A may be 0.5, and a value of the second weighting coefficient B is 0.5. Optionally, the value of A and the value of B may alternatively be configured based on another service type, for example, another scenario, another user equipment vendor, or another user equipment operator. Table 1 is merely used as an example and does not constitute any limitation. Details are not described herein.

In addition to configuring the value of A and the value of B based on the service types, the weighting coefficient A and the weighting coefficient B may alternatively be configured based on service duration. For example, the value of A and the value of B are configured based on different service duration in Table 2, for example, a beam coverage time of a satellite. In Table 2, when service duration is $T_1$, a value of a specific weighting coefficient A is 0, and a value of a specific weighting coefficient B is 1. When the service duration is $T_2$, a value of a specific weighting coefficient A is 0.1, and a value of a specific weighting coefficient B is 0.9. Optionally, the value of A and the value of B may alternatively be configured based on another service duration, for example, service duration of another scenario, another user equipment vendor, or another user equipment operator. Table 2 is merely used as an example and does not constitute any limitation. Details are not described herein.

TABLE 1

Configure the value of A and the value of B based on service types

| Service type | A | B |
|---|---|---|
| IoT device | 1 | 0 |
| Fixed access point | 0.1 | 0.9 |
| Mobile device | 0.5 | 0.5 |
| ... | ... | ... |

TABLE 2

Configure the value of A and the value of B based on service duration

| Service duration | A | B |
|---|---|---|
| $T_1$ | 0 | 1 |
| $T_2$ | 0.1 | 0.9 |
| ... | ... | ... |

Based on the foregoing criterion X, the method 300 selects a user cell in an NTN. An exemplary procedure is shown in FIG. 3. The method 300 for selecting a user cell may be executed by a terminal device or may be executed by a component such as a chip or a circuit configured in the terminal device. The method 300 includes the following steps.

310: The user equipment queries whether there is pre-stored information and determines a frequency for preferential searching based on the prestored information.

The prestored information includes a carrier frequency, and may also include parameter information of some cells, such as previously-received measurement control information or information about a previously camped on or detected cell. The user equipment preferentially selects a cell whose information is prestored to camp on. The user equipment initiates initial cell selection only if cells storing the prestored information are all inappropriate or there is no cell whose information is prestored.

320: The user equipment determines values of two decision factors.

A value of a criterion S in an existing standard, that is, a value of Srxlev, may be reused as a value of signal quality (Signal_Quality) in a first decision factor (signal quality ratio (Signal_Quality/Signal_Quality_reference)). The criterion S in the existing standard is as follows:

$$Srxlev = Qrxlevmeas - (Qrxlevmin + Qrxlevminoffset) - Pcompensation - Qoffsettem$$

Meanings of the parameters in the formula are as follows.
(1) Srxlev (unit: dB) represents a value of S of cell selection.
(2) Qrxlevmeas (unit: dBm) represents a value of a reference signal received power (RSRP) obtained by measuring a cell by the user equipment.
(3) Qrxlevmin (unit: dBm) represents a minimum receive strength of the reference signal received power (RSRP) in the cell and is obtained from a broadcast message.
(4) Qrxlevminoffset represents an offset value of Qrxlevmin. When the UE camping on a VPLMN searches for a high-priority PLMN, a specific offset value may be set to prevent ping-pong reselection. The offset value is mainly used for different user equipment operators.
(5) Pcompensation (unit: dBm) is equal to MAX (Pemax-Pumax, 0), that is, a larger value of 0 and a difference between an allowable maximum uplink transmit power of the user equipment in the cell and an actual maximum uplink transmit power of the user equipment.
(6) Pemax (unit: dBm) represents the allowable maximum uplink transmit power of the user equipment in the cell and is obtained from a broadcast message.
(7) Pumax (unit: dBm) is standard-defined, and represents a maximum uplink transmit power determined based on a capability of the user equipment.
(8) Qoffsettem represents a temporary offset value and is notified in system broadcast.

When performing cell selection, the user equipment obtains a value of Qrxlevmeas of a cell through measurement, obtains values of Qrxlevmin, Qrxlevminoffset, Pemax, and Qoffsettem of the cell based on a system broadcast message delivered by a satellite network device or the cell, obtains a value of Pumax in the formula of the criterion S based on the capability level of the user equipment and the standard definition, and finally calculates a value of Srxlev, that is, the value of the signal quality (Signal_Quality).

A value of reference signal quality (Signal_Quality_reference) in the first decision factor (signal quality ratio (Signal_Quality/Signal_Quality_reference)) is a known preset value by default. The value may vary with different scenarios, different user equipment vendors, different user equipment operators, and other related factors. The preset value may be obtained through calculation or querying by the user equipment.

A value of a beam coverage time (DurationTime$_{beam}$) in a second decision factor (beam coverage time ratio (DurationTime$_{beam}$/DurationTime$_{beam\_}$reference)) is obtained by using a method 500 for obtaining a beam coverage time. Details are described in the following, and details are not described herein.

A value of a reference beam coverage time (DurationTime$_{beam\_}$reference) in the second decision factor (beam coverage time ratio (DurationTime$_{beam}$/DurationTime$_{beam\_}$reference)) is a known preset value by default. The value may vary with different scenarios, different user equipment vendors, different user equipment operators, and other related factors. The preset value may be obtained through calculation or querying by the user equipment.

330: The user equipment determines value configurations of A and B in the criterion X.

The user equipment may determine a value of A and a value of B in the criterion X by querying a table based on a parameter such as a device type of the user equipment. The weighting coefficients may have a plurality of configurations, and the user may determine, based on a current service, the value configurations of A and B in the current criterion X by querying the table. Optionally, the value configurations of A and B in the current criterion X are determined based on a service type by querying Table 1. Optionally, the value configurations of A and B in the current criterion X may be determined based on service duration by querying Table 2. The value configurations of A and B include but are not limited to the configurations in Table 1 and Table 2, may be any combination of the configuration types in Table 1 and Table 2, or may be a combination of the configuration types in Table 1 and Table 2 and another configuration type. This is not limited.

340: The user equipment searches for a cell according to the determined criterion X.

The user equipment calculates a value of the criterion X X$_{lex}$ based on the values of the two decision factors obtained in step 320, the values of the two weighting coefficients obtained in step 330, and the foregoing formula of the criterion X in this embodiment.

If a value of the criterion X X$_{lex}$ of a candidate cell meets a camping threshold requirement, a cell whose value of the criterion X X$_{lex}$ is largest is selected to be camped on.

If there is no candidate cell whose value of the criterion X X$_{lex}$ meets the camping threshold requirement, a cell whose value of the criterion X X$_{lex}$ is largest is selected to be camped on.

Different from a cell that is static in a cellular network, a cell in the NTN is in a high-speed movement state. A terminal may select a cell with optimal signal quality but short coverage duration to camp on. In this case, the terminal needs to reselect a cell soon. Consequently, signaling overheads are increased. Based on the foregoing embodiment, coverage duration of the satellite cell is used as a basis for cell selection, so that more types of parameters that need to be evaluated during cell selection are used, and frequent cell handover resulting from cell selection that is performed based on only single signal quality can be alleviated by configuring different weighting factors and comprehensively considering impact of a plurality of factors. In this way, signaling overheads are reduced, and a more appropriate cell selection criterion is obtained.

Figure 5:
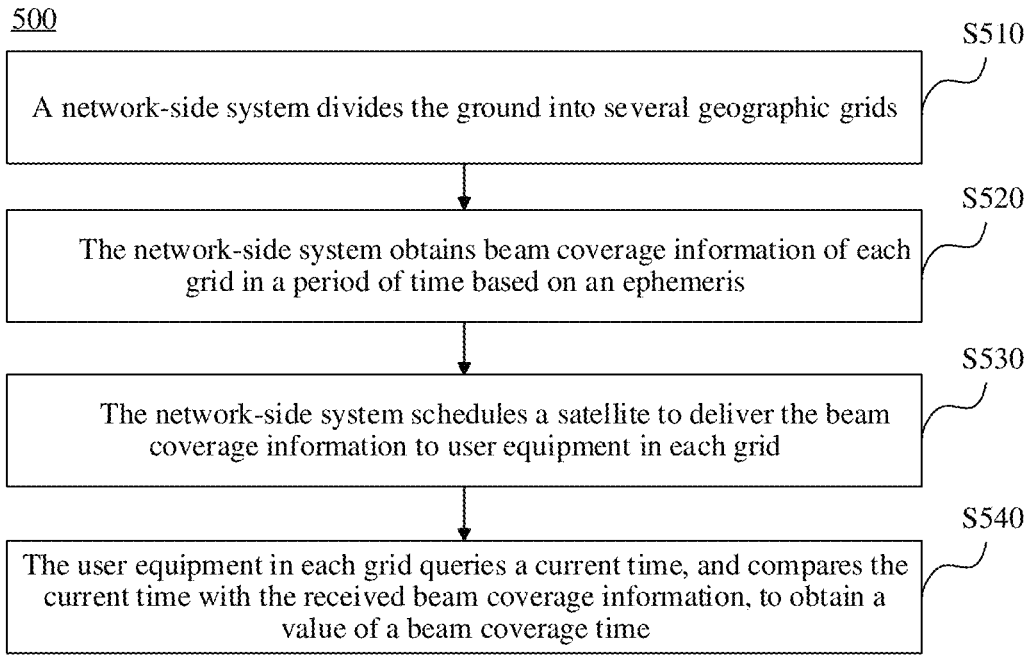
FIG. 5 is a method flowchart of a method 500 for obtaining a beam coverage time.

FIG. 4 is a schematic diagram of the method 500 for obtaining a beam coverage time. FIG. 5 is a flowchart of the method. The method 500 for obtaining a beam coverage time is used to determine a value of a beam coverage time (DurationTime$_{beam}$) in the foregoing method 300 for performing cell selection by a user and the following method 600 for performing cell reselection by a user.

510: A network-side system divides the ground into several geographic grids.

For example, the ground is divided into grids Grid1/2/3/4/5/6, as shown in FIG. 4.

520: The network-side system obtains beam coverage information of each grid in a period of time based on an ephemeris.

530: The network-side system schedules a satellite to deliver the beam coverage information to the user equipment in each grid.

The delivered beam coverage information includes a beam identifier (ID), a start time at which a beam covers a current grid, an over time at which the beam covers the current grid, and the like. Optionally, the beam coverage information may further include other forms, such as the beam identifier (ID), the start time at which the beam covers the current grid, and duration for which the beam covers the current grid. This is not limited.

The satellite in the operation may be understood as a satellite related to satellite communication and a related network device, which may be briefly referred to as a satellite network device.

As shown in FIG. 4, a system schedules a satellite A (Sat A) and a satellite B (Sat B) to deliver related beam coverage information. The satellite B (Sat B) covers only the grid 3 (Grid3) and broadcast information of the grid 3 is as follows.

TABLE 3

| Broadcast information of the satellite B (Sat B) | | | |
|---|---|---|---|
| Grid ID | Beam ID | T_start | T_over |
| Grid 3 | SatB_Beam1 | $T_0$ | $T_1$ |
| Grid 3 | SatB_Beam2 | $T_2$ | $T_3$ |
| ... | ... | ... | ... |

In Table 3, grid IDs in the first column represent geographic grids into which the ground is divided, for example, the grid 3 (Grid3). Beam IDs in the second column represent different beams transmitted by a satellite, for example, SatB_Beam1 and SatB_Beam2. The third column represents a start time at which a beam transmitted by a satellite covers a specific area, for example, T2 and T4. The fourth column represents an over time of at which the beam transmitted by the satellite covers the area, for example, T1 and T5.

At this time, the satellite A (Sat A) covers two grids: a grid 1 (Grid1) and a grid 2 (Grid2). Broadcast information of the satellite A (Sat A) is as follows.

TABLE 4

| Broadcast information of the satellite A (Sat A) | | | |
|---|---|---|---|
| Grid ID | Beam ID | T_start | T_over |
| Grid 1 | SatA_Beam1 | $T_0$ | $T_1$ |
| Grid 1 | SatA_Beam2 | $T_2$ | $T_3$ |

TABLE 4-continued

Broadcast information of the satellite A (Sat A)

| Grid ID | Beam ID | T_start | T_over |
|---|---|---|---|
| Grid 2 | SatA_Beam1 | $T_4$ | $T_5$ |
| Grid 2 | SatA_Beam2 | $T_5$ | $T_6$ |
| ... | ... | ... | ... |

In Table 4, grid IDs in the first column represent geographic grids into which the ground is divided, for example, the grid 1 (Grid1) and the grid 2 (Grid2). Beam IDs in the second column represent different beams transmitted by a satellite, for example, SatA_Beam1 and SatA_Beam2. The third column represents a start time at which a beam transmitted by a satellite covers a specific area, for example, T2 and T4. The fourth column represents an over time at which the beam transmitted by the satellite covers the area, for example, T1 and T5.

540: The user equipment in each grid queries for a current time and compares the current time with the received beam coverage information, to obtain a value of the beam coverage time (DurationTime$_{beam}$).

It should be noted that the current time queried for by the user equipment, the start time and the over time at which the beam transmitted by the satellite covers the specific area are all absolute time. For example, the user equipment may calculate a remaining beam coverage time of beam transmitted by a satellite by performing subtraction based on the end time of beam coverage and the queried for current time or the start time of beam coverage, or perform subtraction based on the start time of beam coverage, beam coverage duration, and the queried for current time.

According to the method 500 for obtaining a beam coverage time shown in FIG. 5, in an NTN scenario, a satellite cell may broadcast a beam coverage time for a specific area to the user equipment in the area, and the beam coverage time is used as a determining basis for cell selection.

In addition to the foregoing method 300 for performing cell selection by a user in a non-terrestrial network (NTN), method 600 performs cell reselection by a user in an NTN. Different from the foregoing embodiment, a specific criterion X in this embodiment is as follows:

$$X_{lex} = \text{Priority}(\text{Signal\_Quality}, \text{DurationTime}_{beam}).$$

A function relationship of the criterion X $X_{lex}$ is to determine a priority sequence of decision factors (a signal quality (Signal_Quality) and a beam coverage time (DurationTime$_{beam}$)) in cell selection decision according to an agreed priority sequence (Priority).

Figure 6:
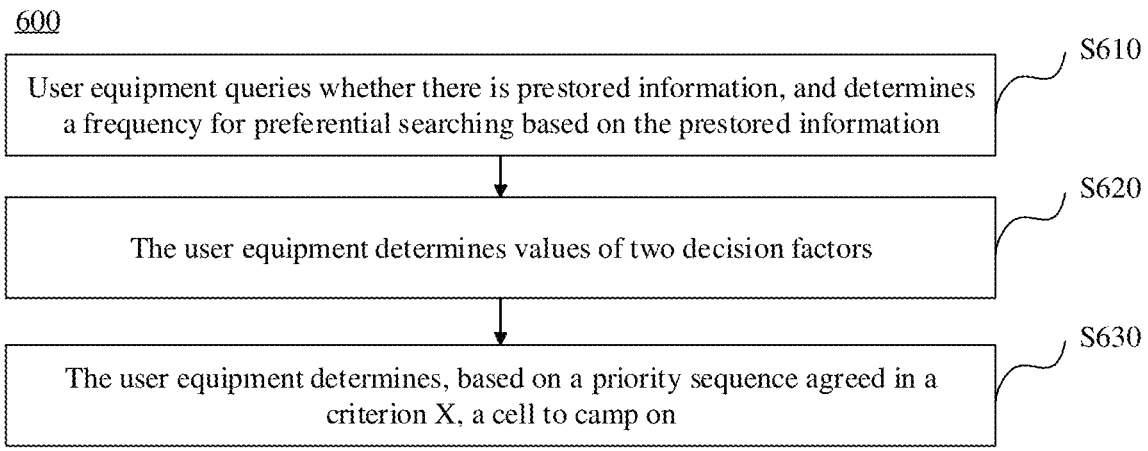
FIG. 6 is a schematic flowchart of a method 600 for reselecting a user cell in an NTN.

FIG. 6 is a schematic flowchart of the method 600 for performing cell selection by a user in an NTN. As shown in FIG. 6, the method includes the following steps:

610: The user equipment queries whether there is prestored information and determines a frequency for preferential searching based on the prestored information.

The prestored information includes a carrier frequency, and may also include parameter information of some cells, for example, previously-received measurement control information or information about a previously camped on or detected cell. The user equipment preferentially selects a cell whose information is prestored to camp on. The user equipment initiates initial cell selection only if cells storing the prestored information are all inappropriate or there is no cell whose information is prestored.

620: The user equipment determines values of two decision factors.

A value of a criterion S in an existing standard, that is, a value of Srxlev, may be reused as a value of a third decision factor (signal quality (Signal_Quality)). The criterion S in the existing standard is as follows:

$$Srxlev = Qrxlevmeas - (Qrxlevmin + Qrxlevminoffset) - Pcompensation - Qoffsettem$$

Meanings of the parameters in the criterion formula are as follows.
(1) Srxlev (unit: dB) represents a value of S of cell selection.
(2) Qrxlevmeas (unit: dBm) represents a value of a reference signal received power (RSRP) obtained by measuring a cell by the user equipment.
(3) Qrxlevmin (unit: dBm) represents a minimum receive strength of the reference signal received power (RSRP) in the cell and is obtained from a broadcast message.
(4) Qrxlevminoffset represents an offset value of Qrxlevmin. When the UE camping on a VPLMN searches for a high-priority PLMN, a specific offset value may be set to prevent ping-pong reselection. The offset value is mainly used for different user equipment operators.
(5) Pcompensation (unit: dBm) is equal to MAX (Pemax-Pumax, 0), that is, a larger value of 0 and a difference that is between an allowable maximum uplink transmit power of the user equipment in the cell and an actual maximum uplink transmit power of the user equipment.
(6) Pemax (unit: dBm) represents the allowable maximum uplink transmit power of the user equipment in the cell and is obtained from a broadcast message.
(7) Pumax (unit: dBm) is standard-defined, and represents a maximum uplink transmit power determined based on a capability of the user equipment.
(8) Qoffsettem represents a temporary offset value, and is notified in system broadcast.

A value of a fourth decision factor (beam coverage time (DurationTime$_{beam}$)) may also be obtained by using the method 500 for obtaining a beam coverage time.

630: The user equipment determines, based on a priority sequence agreed in a criterion X, a cell to camp on.

When a priority of the third decision factor (signal quality (Signal_Quality)) is higher than a priority of the fourth decision factor (beam coverage time (DurationTime$_{beam}$)):

if signal quality (Signal_Quality) of a current cell is lower than a preset threshold, and there is at least one neighboring cell whose signal quality (Signal_Quality) is higher than the preset threshold, the user equipment selects a cell whose signal quality (Signal_Quality) is highest to camp on; or if signal quality (Signal_Quality) of a current cell is lower than a preset threshold, and there is no neighboring cell whose signal quality (Signal_Quality) is higher than the preset threshold, the user equipment selects a cell whose beam coverage time (DurationTime$_{beam}$) is longest to camp on.

When a priority of the fourth decision factor beam coverage time (DurationTime$_{beam}$) is higher than a priority of the third decision factor signal quality (Signal_Quality):

if a beam coverage time (DurationTime$_{beam}$) of a current cell is less than a preset threshold, and there is at least one neighboring cell whose beam coverage time (DurationTime$_{beam}$) is greater than the preset threshold, the user equipment selects a cell whose beam coverage time (DurationTime$_{beam}$) is longest to camp on; or if a beam coverage time (DurationTime$_{beam}$) of a current cell is less than a preset threshold, and there is no neighboring cell whose beam coverage time (DurationTime$_{beam}$) is greater than the preset threshold, the user equipment selects a cell whose signal quality (Signal_Quality) is highest to camp on.

In this embodiment, in a non-terrestrial network (NTN) scenario, coverage duration of a satellite cell is used as a basis for cell selection. A new cell selection criterion is generated according to a priority principle by considering different parameters. This implementation is simpler than the implementation in the first embodiment.

Different from a cell that is static in a cellular network, a cell in the NTN is in a high-speed movement state. A terminal may select a cell with optimal signal quality but short coverage duration to camp on. In this case, the terminal needs to reselect a cell soon. Consequently, signaling overheads are increased. In addition, because of high-speed movement among cells in the NTN, cell selection performed based on measurement of a single parameter cannot meet requirements of different scenarios and different users. An optimized cell selection policy may be obtained by configuring different parameter combinations for different users and different scenarios for cell selection. In the NTN, more types of parameters that need to be evaluated during cell selection are used, and a more appropriate cell selection criterion can be obtained by configuring different weighting factors and comprehensively considering impact of a plurality of factors. In addition, more types of parameters that need to be evaluated during cell selection may be used, a priority function is configured, and a new cell selection criterion is generated as a basis for cell selection.

It should be further understood that, in addition to being applied to the NTN scenario shown in FIG. 1, the method for performing cell selection or reselection by a user in the NTN may be used in other scenarios in which cell selection needs to be performed.

It should be further understood that various numbers such as first and second are distinguished merely for convenience of description and are not intended to limit the scope of the embodiments.

The embodiments may be independent solutions or may be combined based on internal logic. All these solutions fall within the protection scope.

It may be understood that in the foregoing method embodiments, the methods and operations implemented by the user equipment may alternatively be implemented by a component (for example, a chip or a circuit) that may be used in the user equipment, and the methods and the operations implemented by the satellite network device may alternatively be implemented by a component (for example, a chip or a circuit) that may be used in the satellite network device.

The foregoing describes the method embodiments, and the following describes apparatus embodiments. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in the embodiments from the perspective of interaction between various devices. It can be understood that, to implement the foregoing functions, the devices such as the user equipment and the satellite network device include corresponding hardware structures and/or software modules for performing the functions. A person skilled in the art may be aware that with reference to units and method steps in the examples described in the embodiments can be implemented by hardware or a combination of computer software and hardware. Whether a specific function is performed by hardware or hardware driven by computer software depends on design constraints of the solutions. A person skilled in the art may use different methods to implement the described functions, but it should not be considered that the implementation goes beyond the scope.

In the embodiments, division into functional modules of the user equipment or the satellite network device may be performed based on the foregoing method examples. For example, division into functional modules may be performed based on corresponding functions, or two or more functions may be integrated into one processing module. The integrated module may be implemented in a form of hardware or may be implemented in a form of a software functional module. It should be noted that division into the modules is an example and is merely logical function division in the embodiments. In an actual implementation, another division manner may be used. The following provides descriptions by using the example in which division into functional modules is performed based on functions.

Figure 7:
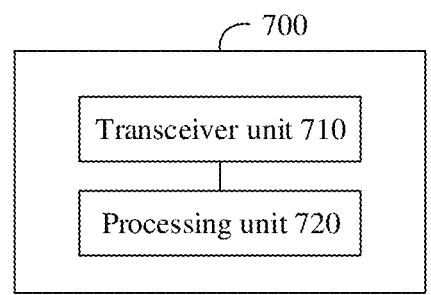
FIG. 7 is a schematic block diagram of a communications apparatus 700 according to an embodiment.

FIG. 7 is a schematic block diagram of a communications apparatus 700 according to an embodiment. The communications apparatus 700 includes a transceiver unit 710 and a processing unit 720. The transceiver unit 710 may communicate with the outside, and the processing unit 720 is configured to process data. The transceiver unit 710 may also be referred to as a communications interface or a communications unit.

The communications apparatus 700 may be configured to execute actions of the user equipment in the foregoing method embodiments or execute actions on the satellite in the foregoing method embodiments.

In an implementation, the communications apparatus 700 may be configured to execute the actions of the user equipment in the foregoing method embodiments. In this implementation, the communications apparatus 700 may be referred to as a terminal device. The transceiver unit 710 is configured to perform receiving and sending related operations on the user equipment side in the foregoing method embodiments. The processing unit 720 is configured to perform a processing-related operation of the user equipment in the foregoing method embodiments.

In this implementation, the transceiver unit 710 is configured to: receive beam coverage information delivered by a satellite and receive a system broadcast message and a reference signal that are related to calculating a value of a criterion S and that are delivered by the satellite or a cell. The processing unit 720 is configured to: query whether there is prestored information; determine a frequency for preferential searching based on the prestored information; determine values of two decision factors (a signal quality ratio (Signal_Quality/Signal_Quality_reference) and a beam coverage time ratio (DurationTime$_{beam}$/DurationTime$_{beam\_reference}$)); determine value configurations of A and B in a criterion X; search for a cell according to the determined criterion X; and select a cell whose value of the criterion X $X_{lex}$ is largest to camp on if a value of the criterion X $X_{lex}$ of a candidate cell meets a camping threshold requirement, or select a cell whose value of the criterion X $X_{lex}$ is largest to camp on if there is no candidate cell whose value of the criterion X $X_{lex}$ meets a camping threshold requirement.

It should be noted that, a method for determining the values of the two decision factors (the signal quality ratio (Signal_Quality/Signal_Quality_reference) and the beam coverage time ratio (DurationTime$_{beam}$/DurationTime$_{beam\_reference}$)) by the processing unit 720 includes: receiving a system broadcast message and a reference signal that are related to calculation of the criterion S and that are delivered by a satellite or a cell, and calculating the value of the criterion S, that is, a value of the signal quality (Signal_Quality) in a first decision factor; and querying a current time, and comparing the current time with received beam coverage information, to obtain a value of the beam coverage time (DurationTime$_{beam}$) in a second decision factor. It should be noted that, a value of reference signal quality (Signal_Quality_reference) in the first decision factor (namely, signal quality ratio (Signal_Quality/Signal_Quality_reference)) and a value of a reference beam coverage time (DurationTime$_{beam\_}$reference) in the second decision factor (namely, beam coverage time ratio (DurationTime$_{beam}$/DurationTime$_{beam\_}$reference)) are known preset values by default. The values may vary with different scenarios, different user equipment vendors, different user equipment operators, and other related factors. The preset values may be obtained through calculation or querying by the processing unit 720. This is not limited.

Optionally, in another implementation, the transceiver unit 710 is configured to: receive beam coverage information delivered by a satellite and receive a system broadcast message and a reference signal that are related to calculating a value of the criterion S and that are delivered by the satellite. The processing unit 720 is configured to: query whether there is prestored information, and determine a frequency for preferential searching based on the prestored information; determine values of decision factors (signal quality (Signal_Quality) and beam coverage time (DurationTime$_{beam}$)); and determine a cell to camp on based on a priority sequence agreed in the criterion X. When a priority of a third decision factor (signal quality (Signal_Quality)) is higher than a priority of a fourth decision factor (beam coverage time (DurationTime$_{beam}$)), the processing unit 720 is configured to select a cell whose signal quality (Signal_Quality) is highest to camp on if signal quality of a current cell (Signal_Quality) is lower than a preset threshold and there is at least one neighboring cell whose signal quality (Signal_Quality) is higher than the preset threshold, or select a cell whose beam coverage time (DurationTime$_{beam}$) is longest to camp on if signal quality (Signal_Quality) of a current cell is lower than a preset threshold and there is no neighboring cell whose signal quality (Signal_Quality) is higher than the preset threshold. When a priority of a fourth decision factor beam coverage time (DurationTime$_{beam}$) is higher than a priority of a third decision factor signal quality (Signal_Quality), the processing unit 720 selects a cell whose beam coverage time (DurationTime$_{beam}$) is longest to camp on if a beam coverage time (DurationTime$_{beam}$) of a current cell is shorter than a preset threshold and there is at least one neighboring cell whose beam coverage time (DurationTime$_{beam}$) is longer than the preset threshold, or selects a cell whose signal quality (Signal_Quality) is highest to camp on if a beam coverage time (DurationTime$_{beam}$) of a current cell is less than a preset threshold and there is no neighboring cell whose beam coverage time (DurationTime$_{beam}$) is longer than the preset threshold.

It should be noted that, a method for determining the values of the two decision factors (the signal quality (Signal_Quality) and the beam coverage time (DurationTime$_{beam}$)) by the processing unit 720 includes: receiving a system broadcast message and a reference signal that are related to calculation of the criterion S and that are delivered by a satellite, and calculating a value Srxlev of the criterion S, that is, the value of a third decision factor (signal quality (Signal_Quality)); and querying a current time, and comparing the current time with received beam coverage information, to obtain the value of a fourth decision factor (beam coverage time (DurationTime$_{beam}$)).

In another implementation, the communications device 700 may be configured to execute the actions of the satellite in the foregoing method embodiments. In this implementation, the communications device 700 may be referred to as a satellite network device. The transceiver unit 710 is configured to perform receiving and sending related operations of the satellite in the foregoing method embodiments. The processing unit 720 is configured to perform a processing-related operation of the satellite in the foregoing method embodiments.

In this implementation, the transceiver unit 710 is configured to: receive scheduling information that is related to beam coverage information and that is sent by a network-side system; send the beam coverage information to the user equipment in each grid; and send, to the user equipment that performs cell selection, a system broadcast message and a reference signal that are related to calculation of the criterion S. The processing unit 720 is configured to: process the scheduling information that is related to the beam coverage information and that is sent by the network-side system, control delivery of the beam coverage information, and control a sending process of the system broadcast message and the reference signal related to calculation of the criterion S.

It should be understood that the transceiver unit 710 may be implemented by a transceiver or a transceiver-related circuit, and the processing unit 720 may be implemented by a processor or a processor-related circuit.

Figure 8:
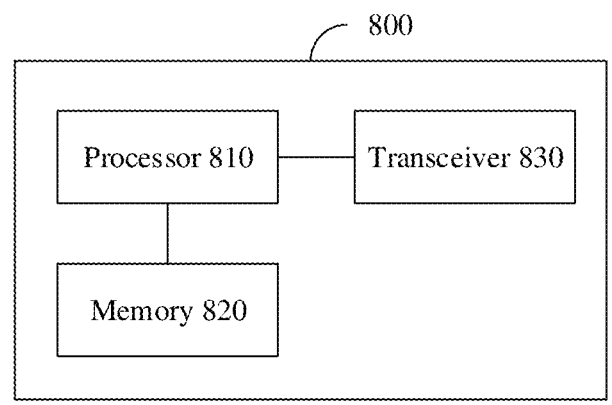
FIG. 8 is a schematic block diagram of a communications device 800 according to an embodiment.

As shown in FIG. 8, a communications device 800. includes a processor 810, a memory 820, and a transceiver 830. The memory 820 stores a program. The processor 810 is configured to execute the program stored in the memory 820, to enable the processor 810 to perform related processing steps in the foregoing method embodiments and enable the processor 810 to control the transceiver 830 to perform receiving and sending related steps in the foregoing method embodiments.

In an implementation, the communications device 800 is configured to execute actions of the user equipment in the foregoing method embodiments. In this case, the execution of the program stored in the memory 820 enables the processor 810 to perform processing steps on the user equipment side in the foregoing method embodiments and enables the transceiver 830 to perform receiving and sending steps on the user equipment side in the foregoing method embodiments. Optionally, the execution of the program stored in the memory 820 enables the processor 810 to control the transceiver 830 to perform the receiving and sending steps on the user equipment side in the foregoing method embodiments.

In another implementation, the communications device 800 is configured to execute actions of the satellite in the foregoing method embodiments. In this case, the execution of the program stored in the memory 820 enables the processor 810 to perform processing steps on the satellite side in the foregoing method embodiments and enables the transceiver 830 to perform receiving and sending steps on the satellite side in the foregoing method embodiments. Optionally, the execution of the program stored in the memory 820 enables the processor 810 to control the transceiver 830 to perform the receiving and sending steps on the satellite side in the foregoing method embodiments.

A communications apparatus 900 may be a terminal device or may be a chip. The communications device 900 may be configured to execute actions of the user equipment in the foregoing method embodiments.

Figure 9:
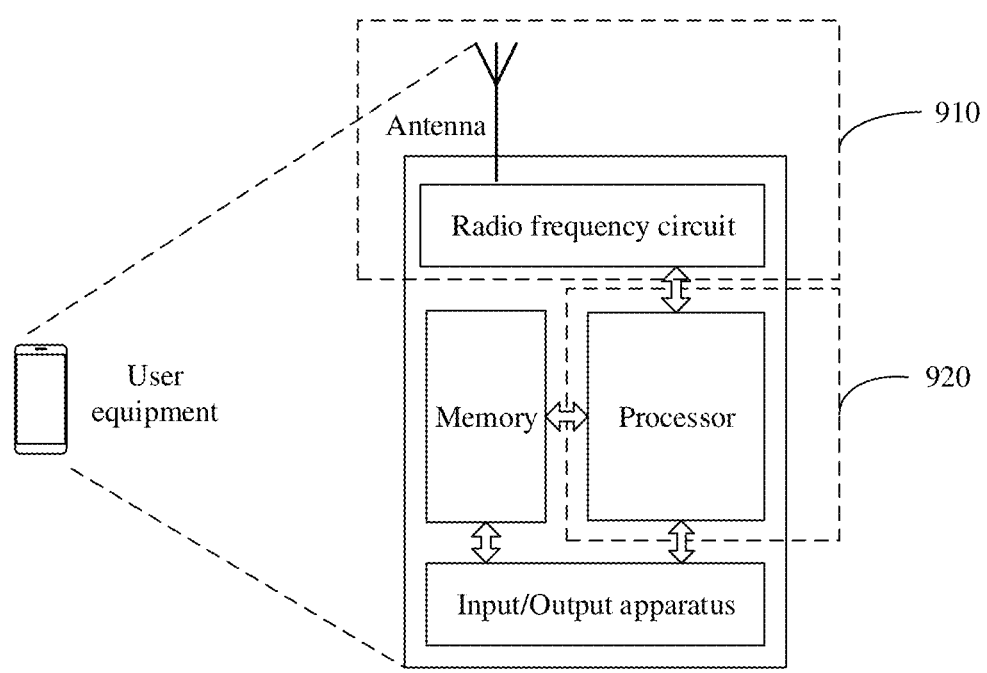
FIG. 9 is a simplified schematic diagram depicting a structure of a terminal device 900 according to an embodiment.

When the communications device 900 is a terminal device, FIG. 9 is a simplified schematic diagram depicting a structure of the terminal device. For ease of understanding and illustration, in FIG. 9, the user equipment is used as an example of the terminal device. As shown in FIG. 9, the terminal device includes a processor, a memory, a radio frequency circuit, an antenna, and an input/output apparatus. The processor is mainly configured to process a communications protocol and communication data, control the terminal device, execute a software program, process data of a software program, and the like. The memory is mainly configured to store a software program and data. The radio frequency circuit is mainly configured to perform conversion between a baseband signal and a radio frequency signal and process the radio frequency signal. The antenna is mainly configured to send and/or receive a radio frequency signal in a form of an electromagnetic wave. The input/output apparatus, such as a touchscreen, a display, or a keyboard, is mainly configured to receive data input by a user and output data to the user. It should be noted that some types of terminal devices may not have an input/output apparatus.

When needing to send data, the processor outputs a baseband signal to the radio frequency circuit after performing baseband processing on to-be-sent data. The radio frequency circuit sends a radio frequency signal to outside in a form of an electromagnetic wave through the antenna after performing radio frequency processing on the baseband signal. When data is sent to the terminal device, the radio frequency circuit receives a radio frequency signal through the antenna, converts the radio frequency signal into a baseband signal, and outputs the baseband signal to the processor. The processor converts the baseband signal into data and processes the data. For ease of description, FIG. 9 shows only one memory and one processor. In an actual terminal device product, there may be one or more processors and one or more memories. The memory may also be referred to as a storage medium, a storage device, or the like. The memory may be disposed independent of the processor or may be integrated with the processor. This is not limited in the embodiments.

In this embodiment, the antenna and the radio frequency circuit that have sending and receiving functions may be considered as a transceiver unit of the terminal device, and the processor that has a processing function may be considered as a processing unit of the terminal device.

As shown in FIG. 9, if the antenna and the radio frequency circuit are considered as the transceiver unit, and the processor is considered as the processing unit, the terminal device includes a transceiver unit 910 and a processing unit 920. The transceiver unit 910 may also be referred to as a transceiver, a transceiver machine, a transceiver apparatus, or the like. The processing unit 920 may also be referred to as a processor, a processing board, a processing module, a processing apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes the receiving unit and the sending unit. The transceiver unit sometimes may also be referred to as a transceiver machine, a transceiver, a transceiver circuit, or the like. The receiving unit sometimes may also be referred to as a receiving machine, a receiver, a receiving circuit, or the like. The sending unit sometimes may also be referred to as a transmitter machine, a transmitter, a transmitter circuit, or the like.

For example, in an implementation, the transceiver unit 910 is configured to perform a receiving operation on the terminal device side in step S320 shown in FIG. 3 and step S530 shown in FIG. 5, and/or the transceiver unit 910 is further configured to perform other receiving and sending steps on the terminal device side. The processing unit 920 is configured to perform the processing operations on the terminal device side in steps S310, S320, S330, and S340 shown in FIG. 3, and step S540 shown in FIG. 5, and/or the processing unit 920 is further configured to perform another processing step on the terminal device side.

For another example, in another implementation, the transceiver unit 910 is configured to perform the receiving operation on the terminal device side in step S620 shown in FIG. 6 and step S530 shown in FIG. 5. The processing unit 920 is configured to perform the processing operations on the terminal device side in steps S610, S620 and S630 shown in FIG. 6, and step S540 shown in FIG. 5, and/or the processing unit 920 is further configured to perform another processing step on the terminal device side.

It should be understood that FIG. 9 is merely an example instead of a limitation. The terminal device including the transceiver unit and the processing unit may not depend on the structure shown in FIG. 9.

When the communications device 900 is a chip, the chip includes a transceiver unit and a processing unit. The transceiver unit may be an input/output circuit or a communications interface. The processing unit may be a processor, a microprocessor, or an integrated circuit integrated on the chip.

An embodiment further provides a communications system. The communications system includes the foregoing terminal device, the candidate cell, and the satellite network device.

An embodiment further provides a computer-readable storage medium. The computer-readable storage medium stores a computer program. When the computer program is executed by a computer, the computer is enabled to implement the method on a terminal device side or the method on a satellite network device side in the foregoing method embodiments.

An embodiment further provides a computer program product including instructions. When the instructions are executed by a computer, the computer is enabled to implement the method on a terminal device side or the method on a satellite network device side in the foregoing method embodiments.

For explanations and beneficial effects of related content in any of the foregoing provided communications apparatuses, refer to corresponding method embodiments provided above. Details are not described herein again.

In the embodiments, the terminal device or the satellite network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the is not limited, provided that communication can be performed according to the method by running a program that records code of the method provided in the embodiments. For example, the method may be executed by a terminal device or a satellite network device, or by a functional module that can invoke a program and execute the program and that is in the terminal device or the satellite network device.

In addition, aspects or features may be implemented as a method, an apparatus, or a product that uses standard programming and/or engineering technologies. The term "product" covers a computer program that can be accessed from any computer-readable device, carrier or medium. For example, a computer-readable medium may include but is not limited to: a magnetic storage device (for example, a hard disk, a floppy disk or a magnetic tape), an optical disc (for example, a compact disc (CD) and a digital versatile disc (DVD)), a smart card, and a flash memory device (for example, an erasable programmable read-only memory (EPROM), a card, a stick, or a key drive). In addition, various storage media may indicate one or more devices and/or other machine-readable media that are configured to store information. The term "machine-readable media" may include but is not limited to a radio channel and various other media that can store, include, and/or carry instructions and/or data.

It should be understood that, the processor in the embodiments may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory mentioned in the embodiments may be a volatile memory or a nonvolatile memory or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

It should be noted that when the processor is a general-purpose processor, a DSP, an ASIC, an FPGA, or another programmable logic device, discrete gate, transistor logic device, or discrete hardware component, the memory (storage module) is integrated into the processor.

It should be noted that the memory includes but is not limited to the foregoing memory, and further includes any other suitable type of memory.

A person of ordinary skill in the art may be aware that, in combination with the examples described in the embodiments, units and method steps may be implemented by electronic hardware or a combination of computer software and electronic hardware. Whether the functions are performed by hardware or software depends on design constraints of the solutions. A person skilled in the art may use different methods to implement the described functions, but it should not be considered that the implementation goes beyond the scope.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical, a mechanical, or another form.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in the embodiments.

In addition, functional units in the embodiments may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the solutions essentially, or the part contributing to the prior art, or some of the solutions may be implemented in a form of a software product. The computer software product is stored in a storage medium and includes several instructions for instructing a computer device (which may be a personal computer, a server, a terminal device, or a satellite network device) to perform all or some of the steps of the methods described in the embodiments. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations, but the protection scope is not limited thereto. Any variation or replacement readily figured out by a person of ordinary skill in the art within the scope disclosed shall fall within the protection scope of the embodiments.

What is claimed is:

1. A method for selecting a cell in a non-terrestrial network (NTN), comprising:
    querying, by user equipment, whether there is first pre-stored information;

determining a frequency for preferential searching based on the first prestored information, and, after determining the frequency, performing the preferential searching based on the frequency;

determining, by the user equipment, a value of a first decision factor and a value of a second decision factor;

determining, by the user equipment, a value of a first weighting coefficient and a value of a second weighting coefficient, and, after determining the value of the first decision factor, the value of the second decision factor, the value of the first weighting coefficient, and the value of the second weighting coefficient, determining a first decision criterion based on the value of the first decision factor, the value of the second decision factor, the value of the first weighting coefficient, and the value of the second weighting coefficient;

searching for, by the user equipment, a cell according to the determined first decision criterion; and selecting, by the user equipment, a cell whose value of the first decision criterion is largest to camp on.

2. The method according to claim 1, wherein the first decision criterion is expressed as:

$$X_{lex}=\text{Function}(\text{Signal\_Quality\_Related\_Parameter}, \text{DurationTime}_{beam}\_\text{Related\_Parameter}, \text{Parameter1}, \text{Parameter2} \ldots )$$

wherein

Signal_Quality/Signal_Quality_reference (signal quality ratio) is the first decision factor, $\text{DurationTime}_{beam}$/$\text{DurationTime}_{beam}$_reference (beam coverage time ratio) is the second decision factor, A is the first weighting coefficient, and is used to represent a weight of the first decision factor in first decision criterion-based cell selection decision, B is the second weighting coefficient, and is used to represent a weight of the second decision factor in the first decision criterion-based cell selection decision; and calculating the first decision criterion $X_{lex}$ involves a sum of a weighted result obtained by multiplying the value of the first decision factor and the first weighting coefficient and a weighted result obtained by multiplying the value of the second decision factor and the second weighting coefficient.

3. The method according to claim 2, wherein a value of Signal_Quality (signal quality) in the first decision factor is a value of a criterion S in an existing standard.

4. The method according to claim 2, wherein a method for obtaining a value of a $\text{DurationTime}_{beam}$ (beam coverage time) in the second decision factor comprises:

dividing, by a network-side system, the ground into several geographic grids;

obtaining, by the network-side system, beam coverage information of each grid in a period of time based on an ephemeris;

scheduling, by the network-side system, a satellite network device to deliver the beam coverage information to user equipment in each grid;

querying, by the user equipment in each grid, a current time; and comparing the current time with the received beam coverage information, to obtain the value of the DurationTime$_{beam}$ (beam coverage time) in the second decision factor.

5. The method according to claim 4, wherein the beam coverage information comprises:

a beam identifier (ID), a start time at which a beam covers a current grid, and an over time at which the beam covers the current grid.

6. The method according to claim 4, wherein the beam coverage information comprises:

a beam identifier (ID), a start time at which a beam covers a current grid, and duration for which the beam covers the current grid.

7. The method according to claim 2, wherein values of Signal_Quality_reference (reference signal quality) in the first decision factor and DurationTime$_{beam}$_reference (reference beam coverage time) in the second decision factor are known preset values, and the preset values may be obtained through calculation or querying by the user equipment.

8. The method according to claim 1, further comprising:
configuring the value of the first weighting coefficient and the value of the second weighting coefficient based on a service type.

9. The method according to claim 8, wherein the service type comprises at least one of the following: an IoT device, a fixed access point, or a mobile device.

10. The method according to claim 1, further comprising:
configuring the value of the first weighting coefficient and the value of the second weighting coefficient based on a service duration.

11. The method according to claim 1, wherein the first prestored information comprises a carrier frequency.

12. A terminal device, comprising:
a transceiver configured to receive beam coverage information delivered by a satellite network device; and
a processor configured to:
query whether there is first prestored information,
determine a frequency for preferential searching based on the first prestored information and trigger the preferential searching to be performed after determining the frequency,
determine a value of a first decision factor and a value of a second decision factor,
determine a value of a first weighting coefficient and a value of a second weighting coefficient, after determining the value of the first decision factor, the value of the second decision factor, the value of the first weighting coefficient, and the value of the second weighting coefficient,
determine a first decision criterion based on the value of the first decision factor, the value of the second decision factor, the value of the first weighting coefficient, and the value of the second weighting coefficient,
search for a cell according to the determined first decision criterion, and
select a cell whose value of the first decision criterion is largest to camp on.

13. The method according to claim 12, wherein the processor is further configured to:
query whether there is second prestored information,
determine a frequency for preferential searching based on the second prestored information,
determine a value of a third decision factor and a value of a fourth decision factor in a second decision criterion,
determine a cell to camp on based on a priority sequence determined in the second decision criterion; and:
when a priority of the third decision factor is higher than a priority of the fourth decision factor, select a cell whose value of the third decision factor is largest to camp on after the value of the third decision factor of a current cell is less than a preset threshold and there is at least one neighboring cell whose value of the third decision factor is greater than the preset threshold; or when a priority of the fourth decision factor is higher than a priority of the third decision factor, select a cell whose value of the fourth decision factor is largest to camp on after the value of the fourth decision factor of a current cell is less than a preset threshold and there is at least one neighboring cell whose value of the fourth decision factor is greater than the preset threshold, or select a cell whose value of the third decision factor is largest to camp on after the value of the fourth decision factor of a current cell is less than a preset threshold and there is no neighboring cell whose value of the fourth decision factor is greater than the preset threshold.

* * * * *